J. C. RORICK.
Butter-Worker.

No. 159,358.

Patented Feb. 2, 1875.

WITNESSES
Mary J. Utley.
Emory H. Bates

INVENTOR
John C. Rorick,
Chipman Hosmer & Co,
Attorneys

UNITED STATES PATENT OFFICE.

JOHN C. RORICK, OF WAUSEON, OHIO.

IMPROVEMENT IN BUTTER-WORKERS.

Specification forming part of Letters Patent No. 159,358, dated February 2, 1875; application filed September 19, 1874.

*To all whom it may concern:*

Be it known that I, JOHN C. RORICK, of Wauseon, in the county of Fulton and State of Ohio, have invented a new and valuable Improvement in Butter-Workers; and I do hereby declare that the following is a full, clear, and exact description of the construction and operation of the same, reference being had to the annexed drawings making a part of this specification, and to the letters and figures of reference marked thereon.

Figure 1:
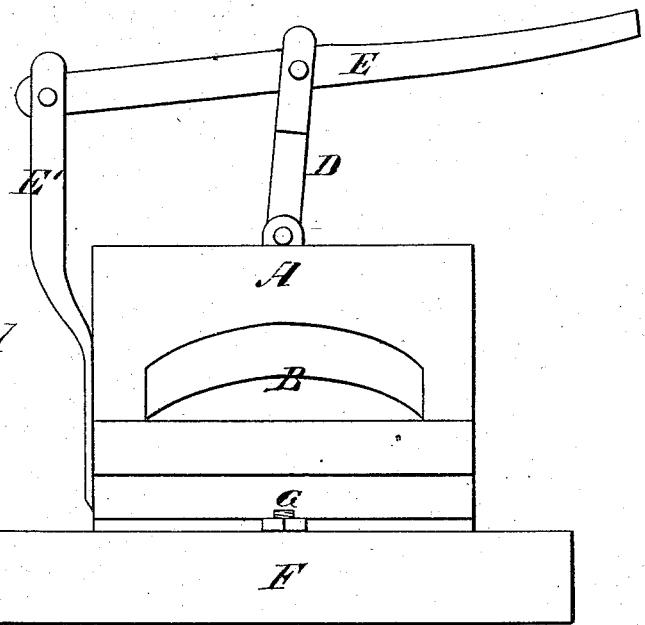
Figure 3:
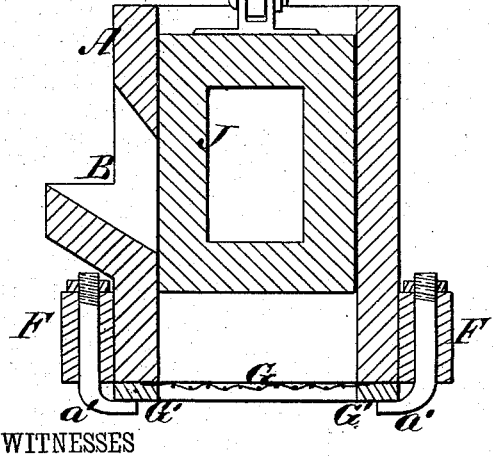
Figure 2:
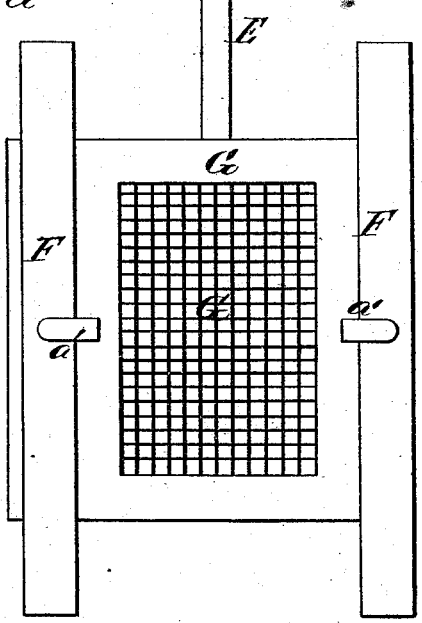

Figure 1 of the drawing is a representation of a side view of my butter-worker. Fig. 2 is a bottom view, and Fig. 3 is a vertical sectional view, of the same.

This invention relates especially to improvements on the butter-worker for which Letters Patent were granted to me bearing date on the 9th day of June, 1874; and it consists in a certain novel arrangement and combination of devices whereby I obtain a vertical butter-worker in which the butter can be fed into the hopper through the side of the same without removing the plunger; at the same time provision is made for supporting the worker upon a vat, and also for readily removing the screen through which the butter is forced, as will be fully understood from the following description.

In the annexed drawing, A designates a rectangular box, and B a hopper or feed-hole, through which the butter is put into the box. J designates a plunger, which is vertically movable in the box A by means of a lever, E, and a connecting-link, D. The lever E has its fulcrum on the upper end of a standard, E', and it allows the power to be applied to the plunger J to a much better advantage than could be done if this lever moved horizontally.

G designates a wire screen, which is secured in a suitable manner to a strong frame, G', which latter is held in close contact against the bottom of the box A by means of hooked clamps a' a', the stems a a of which pass up through two bars, F F, and receive nuts on them. By loosening the nuts hooks a' a' can be turned around, and the screen G removed from the box A and cleaned. The bars F F are rigidly secured to the sides of the box A, and are of sufficient length to afford good supports for the box A upon a vat or other vessel suitable to receive the butter.

In the process of grading butter it is necessary to finely comminute it by forcing it through a sieve or screen. This operation is repeated until it is homogeneous in quality and color.

If the screen through which the butter is forced is vertical the small streams of butter will fall together, and the work will be very imperfectly done. If the screen is horizontal, as I have shown and described, the grading can be accomplished in a very perfect manner, and with few passages of the butter through the screen.

What I claim as new, and desire to secure by Letters Patent, is—

In combination with the box A, having a feed-opening, B, in its side, and a vertically-movable plunger, J, the horizontal screen G, confined by hooks a' a', and the long supporting-bars F F, as described and shown.

In testimony that I claim the above I have hereunto subscribed my name in the presence of two witnesses.

JOHN C. RORICK.

Witnesses:
S. F. WHITING,
W. H. KELLEY.